April 21, 1925.  1,534,782

J. HORRIDGE

MACHINE FOR COMBING COTTON, WOOL, AND THE LIKE

Filed May 5, 1923   3 Sheets-Sheet 1

INVENTOR:
James Horridge
BY Wm Wallace White
ATTY.

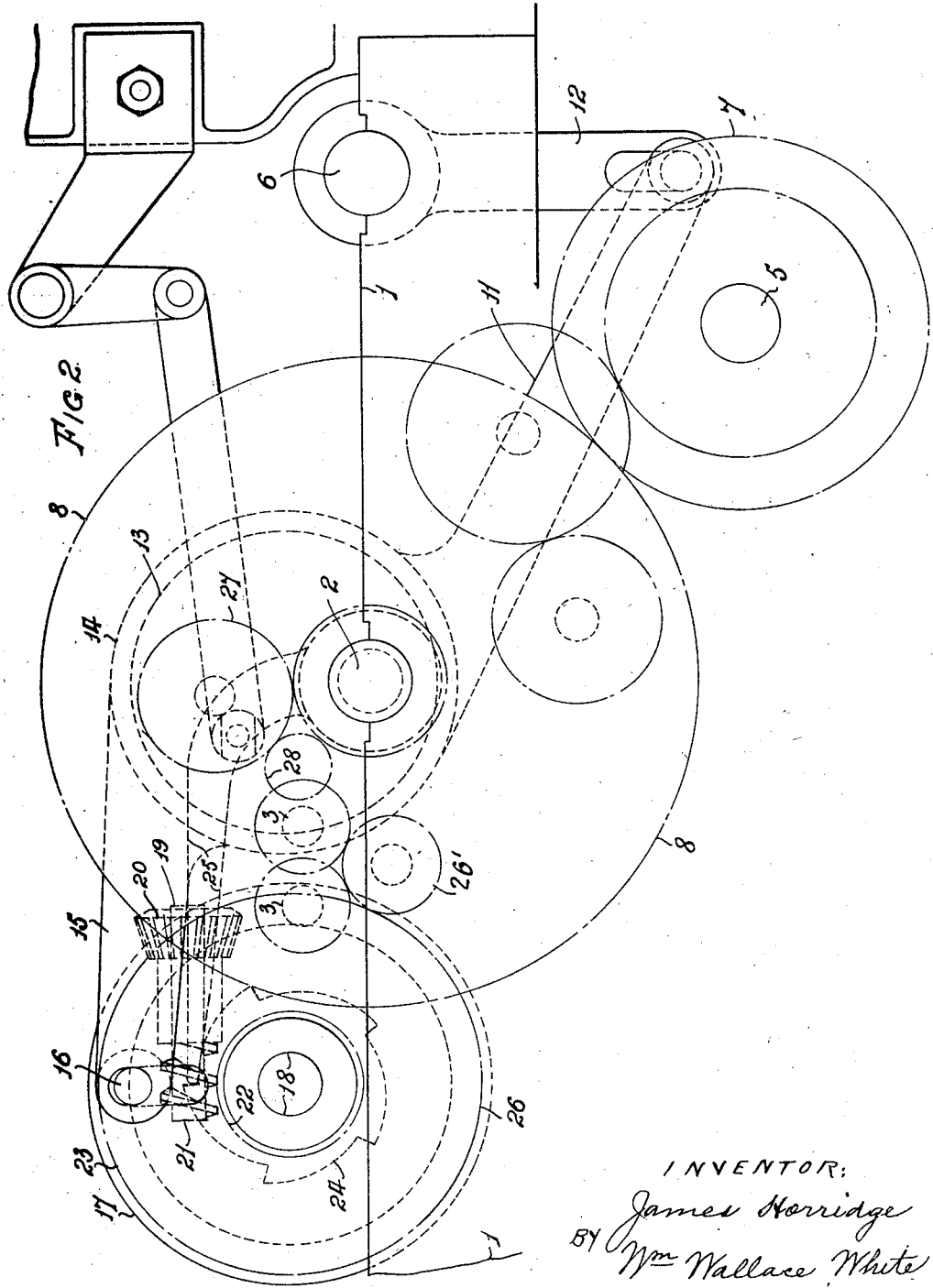

April 21, 1925.
J. HORRIDGE
1,534,782
MACHINE FOR COMBING COTTON, WOOL, AND THE LIKE
Filed May 5, 1923   3 Sheets-Sheet 3
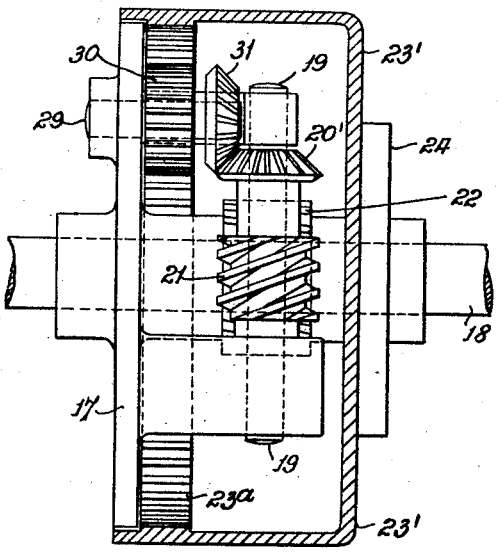
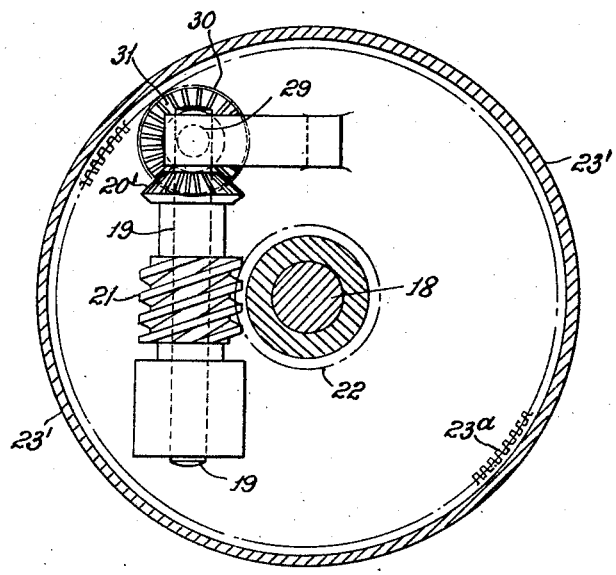
INVENTOR:
James Horridge
BY Wm Wallace White
ATTY.

Patented Apr. 21, 1925.

1,534,782

UNITED STATES PATENT OFFICE.

JAMES HORRIDGE, OF BOLTON, ENGLAND, ASSIGNOR TO JOHN HETHERINGTON AND SONS LIMITED, OF MANCHESTER, ENGLAND.

MACHINE FOR COMBING COTTON, WOOL, AND THE LIKE.

Application filed May 5, 1923. Serial No. 636,817.

*To all whom it may concern:*

Be it known that I, JAMES HORRIDGE, a subject of the King of Great Britain, residing at Bolton, in the county of Lancaster, England, have invented new and useful Improvements in Machines for Combing Cotton, Wool, and the like, of which the following is a specification.

The invention relates to improvements in or relating to machines for combing cotton, wool and the like, and has for its object to provide improved mechanism for driving the back detaching rollers continuously and imparting a partial reverse and forward movement to the front detaching rollers.

The invention will now be described with reference to the accompanying drawings, in which—

Figure 2 is an end view thereof.

Figure 3 is a sectional end view of part of Figure 1 illustrating a modification and Figure 4 is a sectional plan thereof.

Figure 1:
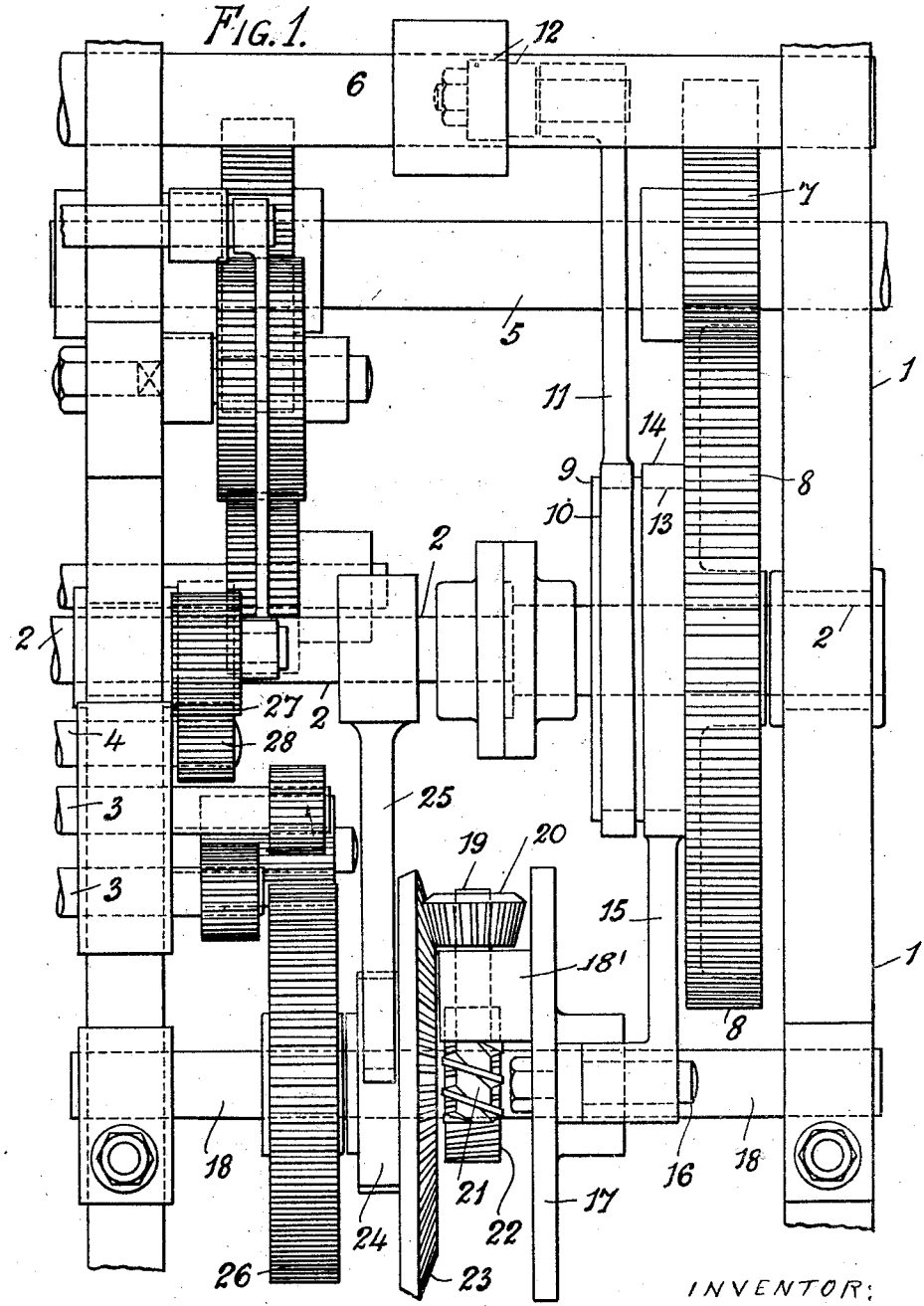
Figure 1 is a plan of the gearing end of a combing machine having the present invention applied thereto.

Referring to Figures 1 and 2—1 represents the main frame of the machine which is of the usual construction, 2 represents the cylinder shaft, 3 the front detaching rollers and 4 the back detaching rollers, 5 represents the main driving shaft and 6 represents the nipper shaft.

The main shaft 5 drives the cylinder shaft 2 through the gear wheels 7 and 8 keyed respectively upon said shafts and the nipper shaft 6 receives an oscillating or rocking motion from an eccentric 9 and strap 10 through a rod 11 which is connected with an arm 12 mounted upon the nipper shaft 6.

Also mounted upon the cylinder shaft 2 is another eccentric 13 the periphery of which is embraced by a strap 14 carried by a rod 15 the other end of which is connected with a stud or pin 16 carried by a plate or disc wheel 17 loosely mounted upon the shaft 18 in such manner that an oscillating or rocking motion is imparted to said wheel 17.

Also carried by the wheel 17 is a bearing 18' in which is mounted a short shaft 19 upon one end of which is mounted a bevel spur pinion 20 and upon the other end of which is a worm 21 which gears with a worm wheel 22 fixed upon the shaft 18.

The bevel pinion 20 gears with a bevel wheel 23 which is loose on the shaft 18 and said bevel wheel 23 carries a ratchet wheel 24 which is acted upon by a catch or pawl 25 mounted upon the cylinder shaft 2.

On the forward stroke of the eccentric rod 15 the disk 17 is correspondingly moved, and with it the shaft 19, pinion 20, and bevel gear 23 move to the extent of a partial revolution about the axis of the shaft 18, said latter shaft being caused to rotate in consequence of the friction between the worm 21 and worm wheel 22. The rotary movement of shaft 18 is transmitted to the front detaching rollers 3 by means of a gear 26 which is fast on shaft 18, and which gear meshes with a pinion 26' constituting one of a train of gearing for driving the rollers 3.

On the rearward stroke of the rod 15 the ratchet wheel 24 is held by the pawl or catch 25 and the bevel pinion 20 in its traverse around the bevel wheel 23 is rotated and through the worm 21 rotates the worm wheel 22 in a rearward direction to the extent of about half the distance through which it was rotated on the forward movement, the total movement imparted to the front detaching rollers 3 being approximately one revolution forward and one half a revolution backward the back detaching rollers 4 being continuously driven from the cylinder shaft 2 by means of the gear wheels 27 and 28.

In the example given at Figures 3 and 4 is illustrated a modification in the construction of part of the gearing.

In this case the bevel wheel 23 is substituted by a casing 23' having an internal ring of teeth 23$^a$ and mounted in the disk 17 is a pin or stud 29 upon which is mounted a pinion 30 which gears with the internal ring of teeth 23$^a$, and also mounted upon the pin or stud 29 is a bevel pinion 31 which gears with the bevel pinion 20' upon the short shaft 19.

The action of this device is similar to that hereinbefore described the motion being conveyed from the internal ring of teeth 23ª to the pinion 20' through the pinions 30 and 31.

It will be understood that the details of construction of the device may be modified without departing from the principle of the invention.

What I claim as my invention and desire to secure by Letters Patent is:—

1. In a combing machine, means for imparting to the front detaching rollers alternate forward and reverse movements, comprising a shaft, a disk, loosely mounted upon said shaft, means for imparting to said disk an oscillating movement, a tangentially arranged bearing carried by said disk, a short shaft carried by said bearing, a bevel pinion carried by one end of said short shaft, a bevel wheel loosely mounted upon said first mentioned shaft in mesh with said pinion, a worm wheel fixed upon said shaft, a worm carried by the short shaft and engaging said worm wheel, a ratchet wheel and pawl for preventing the movement of the loosely mounted bevel wheel in one direction of motion, the arrangement being such that an alternate forward and backward motion is imparted to said first mentioned shaft, the backward motion being through a distance approximately half the distance the shaft is moved on the forward motion, and gearing for conveying said motion to the front detaching rollers.

2. In a combing machine having front detaching rollers, the combination of a rotatable shaft disposed in parallelism with said rollers, a disk mounted for rotation on said shaft, means for imparting an oscillatory movement to said disk, cooperating means carried by said disk and shaft for imparting to the shaft an alternate forward and backward rotation in response to the oscillations of the disk, the backward motion of the shaft being through a distance approximately half the distance through which it is moved on the forward motion, and gearing between said shaft and detaching rollers for transmitting the motion of the shaft to said rollers.

3. In a combing machine having front detaching rollers, the combination of a rotatable shaft in parallelism with said rollers, a disk mounted for rotation on said shaft, means for imparting an oscillatory movement to said disk, a gear wheel mounted for rotation on said shaft, a stud shaft mounted for rotation on said disk in tangential relation to said first shaft, a worm wheel secured to said shaft, a worm carried by said stud shaft in mesh with said worm wheel, a pinion secured to the stud shaft in mesh with said gear, means for holding said gear against backward motion, and gearing between said shaft and detaching rollers for transmitting the motion of the shaft to said rollers.

In testimony whereof I have signed my name to this specification.

JAMES HORRIDGE.